United States Patent
Pannwitz et al.

(10) Patent No.: US 6,710,992 B2
(45) Date of Patent: Mar. 23, 2004

(54) CHARGE/DISCHARGE PROTECTION CIRCUIT FOR A RECHARGEABLE BATTERY

(75) Inventors: Axel Pannwitz, Lenningen (DE); Hans Martin von Staudt, Weilheim/Teck (DE); Achim Stellberger, Kronau (DE)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 104 days.

(21) Appl. No.: 10/057,490

(22) Filed: Jan. 24, 2002

(65) Prior Publication Data

US 2002/0097543 A1 Jul. 25, 2002

(30) Foreign Application Priority Data

Jan. 25, 2001 (DE) .......................... 101 03 336

(51) Int. Cl.[7] .............................. H02H 3/20; H02H 3/08
(52) U.S. Cl. ...................... 361/90; 361/93.02
(58) Field of Search .................. 361/90, 92, 93.2, 361/93.4, 104; 320/134, 152, 154, 163, 164

(56) References Cited

U.S. PATENT DOCUMENTS

| 5,550,701 | A |   | 8/1996  | Nadd et al. ................ 361/103 |
| 5,602,460 | A | * | 2/1997  | Fernandez et al. ......... 320/152 |
| 5,703,463 | A | * | 12/1997 | Smith ......................... 320/134 |
| 6,172,482 | B1 |  | 1/2001  | Eguchi ........................ 320/134 |

FOREIGN PATENT DOCUMENTS

JP           10-66251 A       6/1998     ............ H02H/7/18

* cited by examiner

*Primary Examiner*—Rajnikant B. Patel
(74) *Attorney, Agent, or Firm*—George O. Saile; Stephen B. Ackerman

(57) ABSTRACT

The invention refers to a charge/discharge protection circuit for a rechargeable battery which is protected by a fusible link, where the rechargeable battery comprises a control logic which opens or closes a load switch depending on the magnitude of the battery voltage, the voltage on the charge/discharge terminals of the protection circuit and the charge/discharge current. The protection circuit is designed so that the electric strength needs to match only the actual maximum battery voltage, thus requiring little real estate on an IC chip and also allowing most components to be integrated.

13 Claims, 3 Drawing Sheets

CHARGE/DISCHARGE PROTECTION CIRCUIT FOR A RECHARGEABLE BATTERY

Figure 1:
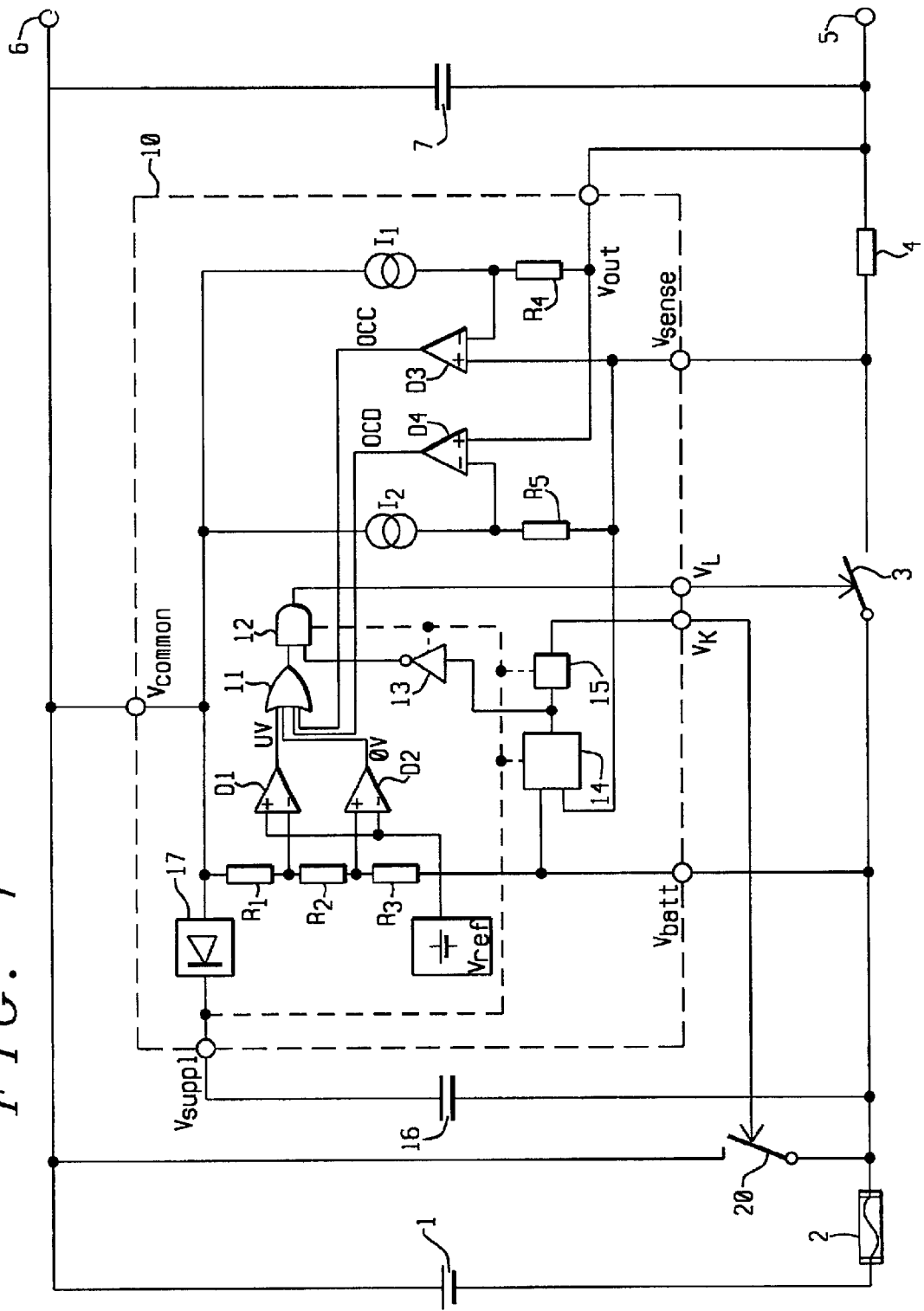

The invention refers to a charge/discharge protection circuit for a rechargeable battery which is protected by a fusible link, where the rechargeable battery comprises a control logic which opens or closes a load switch depending on the magnitude of the battery voltage, the voltage on the charge/discharge terminals of the protection circuit and the charge/discharge current.

Such a protection circuit is known as an integrated circuit (IC) with the designation UCC 3952 of Texas Instruments Incorporated. This circuit monitors, among other things, the charge/discharge circuit voltage of the battery and disconnects from the battery via the load switch the charging device when charging and disconnects the load (e.g., a mobile transmitter) when discharging. In addition, the protection circuit monitors the discharge current via a current sensing resistor and opens the load switch when a limit is exceeded (of, e.g., 3 A).

The electric strength of the known protection circuit and the breakdown voltage of the load switch have to be designed for the highest (reasonably to be expected) applied voltage, which for example occurs when connecting a defective charging device or a charging device which was intended for a battery with a higher than the actual voltage or a higher number of cells.

To achieve in an integrated circuit technology a high electric strength, respectively breakdown voltage, large silicon areas and/or special technologies are necessary. Alternatively, though the control logic can be provided with an electric strength commensurate with the actual battery voltage, the load switch then needs to be implemented as an external component with a correspondingly high breakdown voltage.

The task of this invention is based on the requirement to create a charge/discharge protection circuit of the above described type which in normal operation offers the usual functions, whose electric strength, however, needs to be determined only by the actual maximum battery voltage, and which therefore is economical and, when produced in an integrated circuit technology, requires little real estate on an IC chip.

This task is inventively solved with a protection circuit of the above discussed type by providing the control logic with an over-voltage detector. The over-voltage detector is activated and closes a short-circuit switch when the over-voltage detector reaches a fixed voltage limit which in turn depends on the electric strength of the protection circuit. The closing of the short-circuit switch connects the battery terminals via a fusible link.

In the present context the terms "battery" and "battery voltage" stand for a rechargeable current source or its potential, in particular also for a voltage source comprising only one cell, e.g., a Lithium-Ion cell. It is well known that such voltage sources are typically provided for mobile telephones and are, therefore, subject to special safety rules. Massive overcharging in particular must be reliably prevented because of the associated danger of explosion and fire hazard. This is achieved as proposed by the present invention with a circuit technology with a significantly lower than required electric strength for the worst case condition. And that is accomplished by closing the short-circuit switch when an appropriate predetermined voltage limit is reached, with the resulting short circuit leading to the guaranteed destruction of the fusible link, thus protecting the battery from a dangerous current over-charge.

The proposed embodiment according to the invention makes it possible therefore to economically realize the protection circuit in standard sub-micro technology having a low break-down voltage. If desired, this allows the load switch to be integrated on the same chip with the other components of the protection circuit, whereas now it is frequently realized as a discrete component.

The over-voltage detector preferably receives as input voltage the voltage via the opened load-current switch (claim 2). The voltage limit, at which the over-voltage detector responds, is defined in this case as the voltage just below the break-through voltage of the load-current switch.

Alternatively, the over-voltage detector can receive as input voltage the difference between the voltage at the charge/discharge terminals and the voltage at the battery contacts (claim 3). The voltage limit is then defined as that highest potential at which at least all functionally important circuit components still perform reliably.

When the voltage limit is exceeded it is preferred that the control logic close the previously open load-current switch followed by the time-delayed closing of the short-circuit switch (claim 4). The reason why the load-current switch is open in the presently considered failure mode is that the protection circuit has determined that the maximally allowable load current for normal operation has been exceeded, and has accordingly opened the load-current switch. By closing the load-current switch when the voltage limit is exceeded, dangerously high potentials are reduced via the load-current switch. However, now an inadmissibly high load current flows. This already can lead to the desired melting of the fusible link if the current is high enough. If the current is not high enough then the short-circuit switch will close after a delay time in the range of milliseconds or maximally of seconds and initiates thereby the destruction of the fusible link.

The control logic, appropriately, receives a first supply voltage from the battery, and at least a second supply voltage from an auxiliary voltage source, such as a charged buffer capacitor, when the battery voltage is too low (claim 5). This assures in the presently contemplated failure mode that the protection circuit is supplied with the necessary supply voltage to function until the fusible link is destroyed.

The over-voltage detector preferably includes a bistable flip-flop (claim 7) so that the closing of the short-circuit switch is initiated even when the predetermined voltage limit is exceeded for only a short time.

In one preferred embodiment of the present invention a resistive means coupled between load current switch 3 and charge/discharge terminal 5, shown in FIG. 1 as resistor 4, acts as a current sensor to determine the magnitude of the charge or discharge current. In another preferred embodiment of the present invention the transmission resistance of the load-current switch 3 may be utilized as the current sensing resistance.

Comparators D1, D2 of the control logic 10 are arranged to recognize a battery-side over- or under-voltage, respectively, and the comparator output signals trigger the opening of load switch 3 in the event of an over- or under-voltage.

With the exception of capacitors, at least all circuit elements of low power losses are integrated on one chip. In addition, but again excluding capacitors, all parts of the circuit can be integrated on the chip, including the load switch 3, the short-circuit switch 20, and the fusible link 2.

An embodiment of the protection circuit according to the present invention is shown schematically simplified in the drawing. It shows:

FIG. 1 a block diagram

Figure 2:
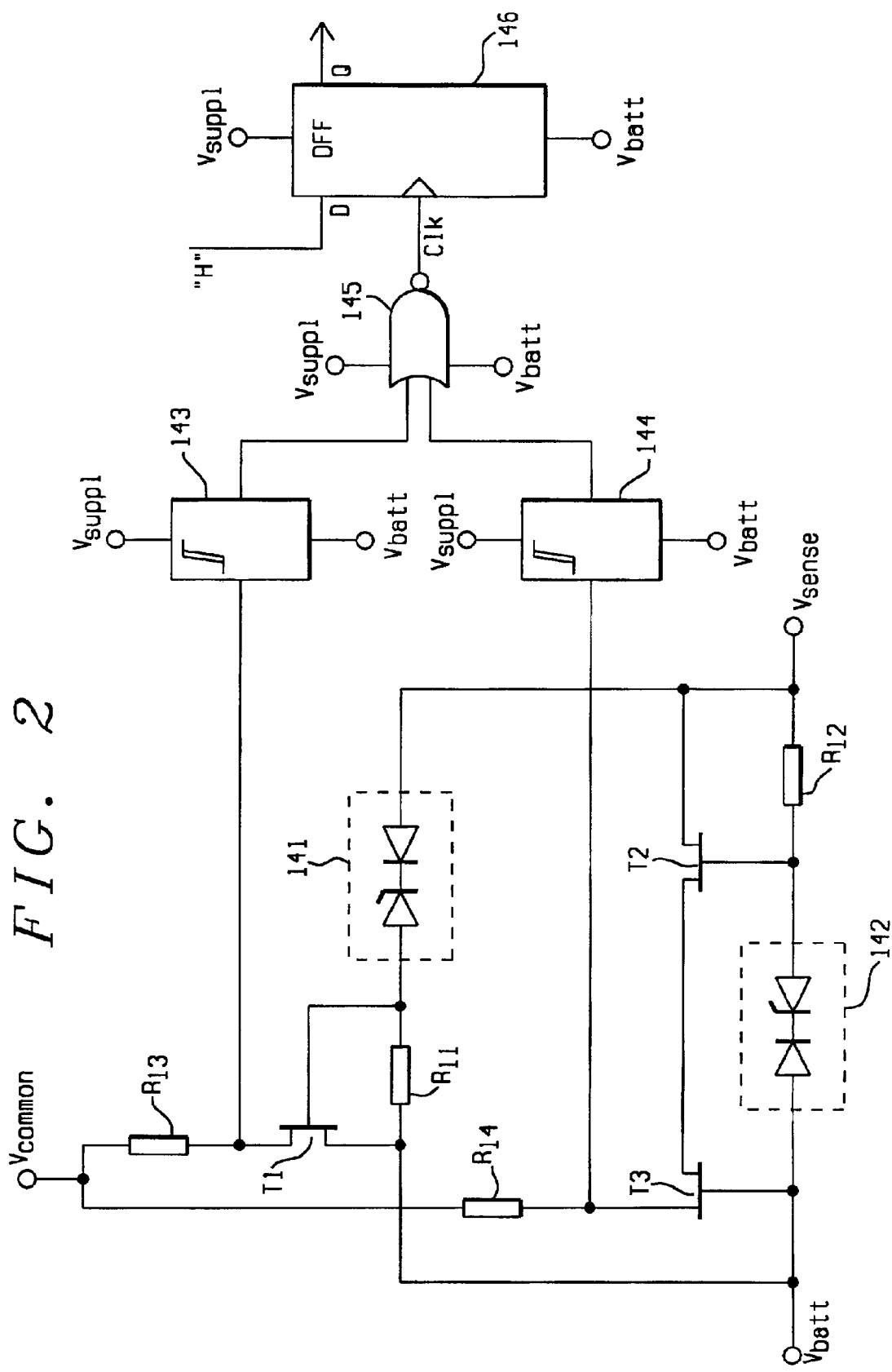
Figure 3:
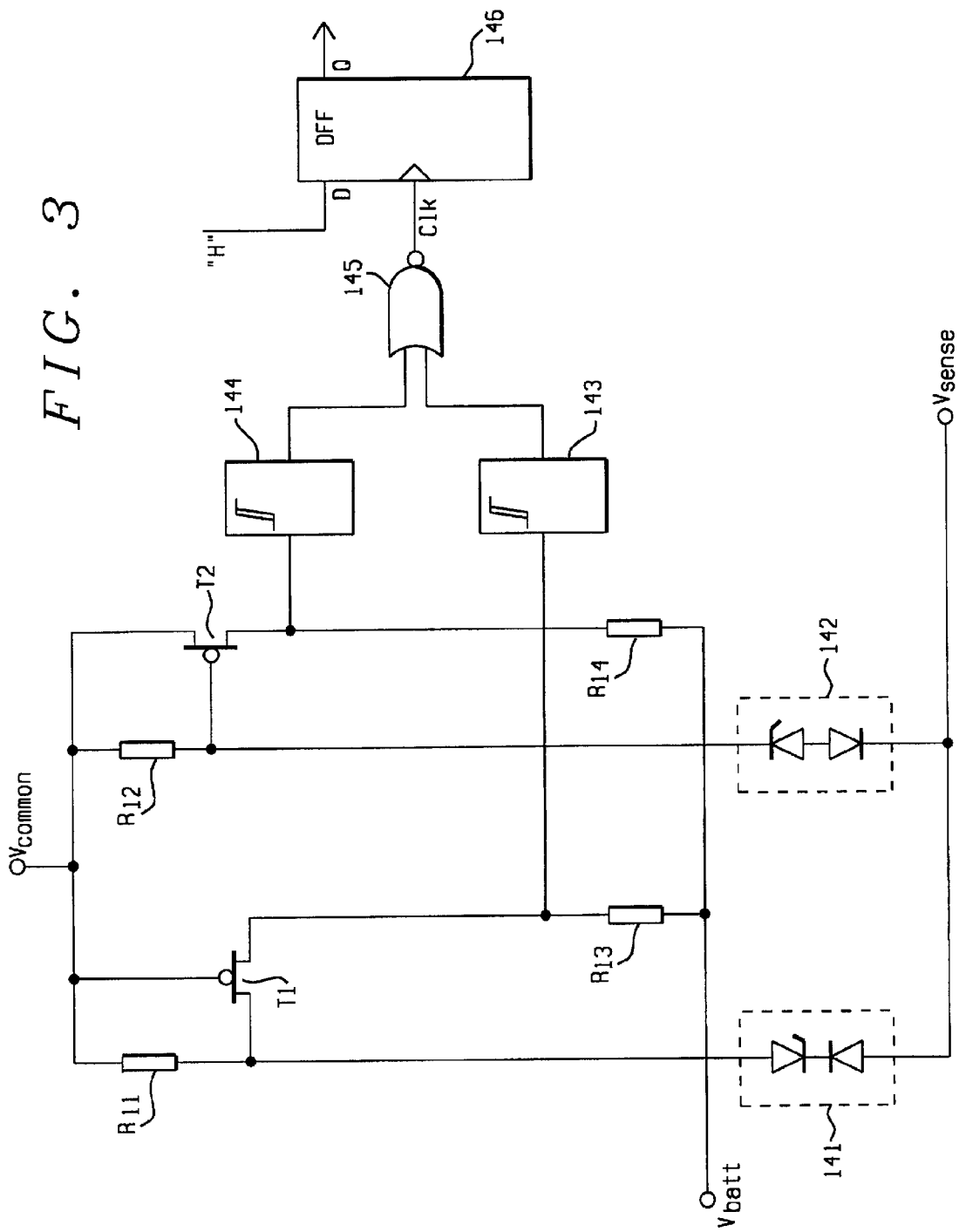

FIG. 2 a first embodiment of the over-voltage detector within the protection circuit according to FIG. 1 and FIG. 3 a second embodiment of the over-voltage detector.

According to FIG. 1, the negative supply of a Lithium-Ion cell 1 is coupled to contact 5 of a charge/discharge connection via a fast fusible link 2 (having a nominal trip current of, for example, 4 Ampere), a gated semiconductor load switch 3 and in series with a current sensing resistor 4. The other contact 6 of the charge/discharge connection is coupled to the positive supply of Lithium-Ion cell 1. Coupled parallel to contacts 5 and 6 is a filter capacitor 7 to protect against steeply sloped voltage increases.

The protection circuit comprises a control logic, preferably in the form of an integrated circuit, and altogether designated 10. It compares battery voltage $V_{batt}$, reduced via resistive divider $R_1$, $R_2$, $R_3$, using differential amplifiers D1 and D2 with an internally generated reference voltage $V_{ref}$. In the case of under-voltage the differential amplifier D1 produces an output signal UV. In the case of over-voltage the differential amplifier D2 produces an output signal OV. Furthermore, the control logic compares the charge and the discharge current with a predetermined maximum value each. Towards that end differential amplifiers D3, respectively D4, compare the voltage $V_{sense}$ as measured between load switch 3 and current sensing resistor 4, respectively the output voltage $V_{out}$ at terminal 5, with the corresponding reference voltages which can be derived from $V_{out}$, respectively $V_{sense}$, through resistances $R_4$, respectively $R_5$, in series with constant current source $I_1$ and $I_2$. Differential amplifiers $D_3$, $D_4$, deliver output signals OCC, OCD, respectively, when reaching the maximum charge or discharge current, respectively.

The output signals UV, OV, OCC, and OCD of differential amplifiers D1 to D4 are coupled via OR gate 11 to one of the inputs of AND gate 12, whose other input receives in normal operation a signal "H" from the output of inverter 13. The output signal $V_L$ of AND gate 12 then controls the opening of load switch 3.

To monitor the potential across the opened load switch, over-voltage detector 14 (having the characteristic of a bistable flip-flop) receives the battery voltage $V_{batt}$ and the voltage $V_{sense}$, respectively. Over-voltage detector 14 switches into a second stable state when a defined voltage limit is reached or is exceeded which is dependent upon the break-down voltage of load switch 3. Over-voltage detector 14 delivers in this second state an output signal which sets via inverter 13 the second input of AND gate 12 to "L", thereby closing load switch 3 and removing the over-voltage. Delay-element 15 receives the same output signal and delivers to connector $V_K$ a control signal after a delay of typically several hundred milliseconds and which controls the closing of short-circuit switch 20, the latter connecting the battery terminals via fusible link 2. If a voltage source (for example, a defective charging device) connected to external terminals 5, 6 has not yet led to the destruction of fusible link 2 at this point in time, i.e., during the time delay, then fusible link 2 will be destroyed immediately through the high short-circuit current delivered by Lithium-Ion cell 1. This reliably separates Lithium-Ion cell 1 from external terminals 5, 6.

The subsequent rise in potential will with great probability permanently render the protection circuit useless. This, however, is an intentional trade-off.

The dotted line indicates that the parts of control logic 10 may be located on an IC. Integrated on the same IC may also be load switch 3, and/or short-circuit switch 20, and/or fusible link 2.

Closing of short-circuit switch 20 leads to the immediate collapse of the outer supply voltage of the protection circuit. However, short-circuit switch 20 and load switch 3 must receive their control signal at least long enough until fusible link 2 is destroyed with certainty. This is achieved via buffer capacitor 16 which is placed between voltage $V_{batt}$ and a terminal $V_{suppl}$ of the protection circuit. Buffer capacitor 16 is normally charged to the battery voltage via semiconductor switch 17 (indicated as a diode). If the outer supply voltage drops away then switch 17 opens and buffer capacitor 16 delivers for a sufficiently long time, via the dotted connection, the supply voltage for over-voltage detector 14, delay-element 15, inverter 13, and AND gate 12.

FIG. 2 shows an example of an embodiment of the over-voltage detector. Designations at the external terminals correspond to those of FIG. 1. Voltages $V_{batt}$ and $V_{sense}$ are applied to trigger elements 141, 142 via resistors $R_{11}$, $R_{12}$, respectively. The trigger elements are shown symbolically only as a serial connection of a zener and a back-biased diode. Trigger element 141 becomes conductive when the difference between $V_{batt}$ and $V_{sense}$ in the positive direction reaches its selected threshold, where the selected threshold is lower than the breakdown voltage of load switch 3. This causes NMOS transistor T1 to become conductive. The potential on its load resistor $R_{13}$ increases toward $V_{batt}$. The following Schmitt Trigger 143 produces from this a steeply sloped signal, which is applied to the first input of NAND gate 145. The output of NAND gate 145 thereupon switches to "H", thereby producing a rising clock signal Clk for the clock input of a following D-flip-flop 146, whose D input is tied to "H", whereby output Q also switches to "H". Output Q corresponds to the output of circuit block 14 in FIG. 1.

If the difference between $V_{batt}$ and $V_{sense}$ reaches the predetermined voltage limit in the negative direction, then, in similar fashion, a voltage is produced via trigger element 142, NMOS transistor T2, and NMOS transistor T3, which then produces via second Schmitt-Trigger 144 and the second input of NAND gate 145 also a signal "H" at the output of D-flip-flop 145. NMOS transistor T3 functions in this case simply as a cascode-transistor to insure that the allowable drain-source voltage of transistor T1 is not exceeded.

FIG. 3 shows another example of an embodiment of the over-voltage detector 14 for a protection circuit in accordance with FIG. 1. Differing from the embodiment according to FIG. 2 but having in principle the same arrangement, the trigger elements are not supplied by $V_{batt}$ and $V_{sense}$ but by $V_{common}$ and $V_{sense}$, i.e., the potential at charge/discharge terminals 5, 6 when load switch 3 is opened. Otherwise the circuit uses the same elements as the circuit according to FIG. 2 and, therefore, also has the same reference numbers. However, it does not need a cascode transistor but requires PMOS in place of NMOS transistors.

In addition, a combination of the circuits according to FIGS. 2 and 3 can have advantages. For example, negative over-voltages could be implemented with the circuit according to FIG. 2, and positive over-voltages could be implemented with the circuit according to FIG. 3. As a further improvement, trigger elements 141 and 142 could be modified so that their threshold voltages are, e.g., independent of temperature changes.

What is claimed is:

1. A charge/discharge protection circuit for a rechargeable battery, comprising:
   a short-circuit switch coupled in series with a fusible link across the terminals of a rechargeable battery, where one end of said fusible link is connected to one of said battery terminals, where said short-circuit switch when closed leads to the guarantied destruction of said fusible link, thereby protecting said rechargeable battery from a dangerous current over-charge;

one end of a load current switch coupled to the junction of said fusible link and said short-circuit switch, the other end of said load current switch in communication with a first charge/discharge terminal of said protection circuit, said load current switch connecting or disconnecting said first charge/discharge terminal from said rechargeable battery;

a second charge/discharge terminal of said protection circuit coupled to the other end of said battery terminal;

a control logic, coupled between said battery terminals and in communication with said first charge/discharge terminal, said control logic protecting said battery and said first and said second charge/discharge terminal from over-/under-voltage conditions, where said control logic opens or closes said load current switch depending on the magnitude of the battery voltage and the potential at said first and said second charge/discharge terminal of said protection circuit, said control logic comprising an over-voltage detector which closes said short-circuit switch when reaching a predetermined voltage limit, where said predetermined voltage limit depends on the electric strength of said protection circuit; and where with the exception of capacitors, all parts of said protection circuit are integrated on said chip, including said load current switch, said short-circuit switch, and said fusible link.

2. The protection circuit according to claim 1, wherein said over-voltage detector receives as input voltage the potential via the opened load-current switch.

3. The protection circuit according to claim 2, wherein said over-voltage detector receives as input voltage the difference between the potential at said first and said second charge/discharge terminal and the potential at said battery terminals.

4. The protection circuit according to claim 3, wherein, when said predetermined voltage limit is exceeded, said control logic closes the previously open load-current switch followed by the time-delayed closing of said short-circuit switch.

5. The protection circuit according to claim 4, wherein said control logic receives a first supply voltage from said battery and a second supply voltage from an auxiliary voltage source, such as a charged buffer capacitor.

6. The protection circuit according to claim 1, wherein said over-voltage detector comprises a bistable flip-flop.

7. The protection circuit according to claim 6, wherein an output signal of said bistable flip-flop feeds a delay-element, said delay-element providing the control signal for the closing of said short-circuit switch.

8. The protection circuit according to claim 7, wherein said output signal of said bistable flip-flop via an inverter couples to the first input of an AND gate, where the output signal of said AND gate controls said load-current switch.

9. The protection circuit according to claim 1, wherein a resistive means in communication with said other end of said current-load switch and said first charge/discharge terminal acts as a current sensor to determine the magnitude of the charge or discharge current.

10. The protection circuit according to claim 1, wherein the transmission resistance of the said load-current switch is used as a current sensing resistance.

11. The protection circuit according to claim 1, wherein said control logic has a first and a second comparator (D1, D2), to recognize a battery-side over-/under-voltage, respectively.

12. The protection circuit according to claim 11, wherein an output signal from each of said first and said second comparator triggers the opening of said load switch in the event of an over-/under-voltage, respectively.

13. The protection circuit according to claim 1, wherein a filter capacitor is coupled parallel to said charge/discharge terminals.

* * * * *